United States Patent [19]
Lent et al.

[11] Patent Number: 5,837,042
[45] Date of Patent: Nov. 17, 1998

[54] INVISIBLE FLUORESCENT JET INK

[75] Inventors: Bruce A. Lent, Oak Park; Godwin Deng, Schaumburg; Jose F. Ezpeleta, Chicago, all of Ill.

[73] Assignee: Videojet Systems International, Inc., Wood Dale, Ill.

[21] Appl. No.: 661,180

[22] Filed: Jun. 10, 1996

Related U.S. Application Data

[60] Provisional application No. 60/003,815 Sep. 15, 1995.

[51] Int. Cl.$^6$ ..................................... C09D 11/02
[52] U.S. Cl. .................... 106/31.14; 106/31.15; 283/74; 347/20; 427/7
[58] Field of Search ............... 106/31.14, 31.15; 283/74; 347/20; 427/7

[56] References Cited

U.S. PATENT DOCUMENTS

| | | |
|---|---|---|
| 4,202,491 | 5/1980 | Suzuki . |
| 4,540,595 | 9/1985 | Acitelli et al. . |
| 4,736,425 | 4/1988 | Jalon . |
| 4,983,817 | 1/1991 | Dolash et al. . |
| 5,093,147 | 3/1992 | Andrus et al. . |

FOREIGN PATENT DOCUMENTS

| | | |
|---|---|---|
| 53-140105 | 12/1978 | Japan . |
| 1135683 | 5/1989 | Japan . |

OTHER PUBLICATIONS

PCT Search Report dated Sep. 11, 1996.
Chandrasekhar, *Journal of Imaging Technology*, 16, 158–161 (Aug., 1990).
Wieczoreck, Riedel de Haën, Luminescent Pigments for the Security Coding of Banknotes, Lecture in Haarlem, Netherlands, pp. 1–7 (1990).

*Primary Examiner*—Deborah Jones
*Attorney, Agent, or Firm*—Leydig, Voit & Mayer Ltd.

[57] ABSTRACT

The present invention provides jet ink compositions suitable for producing security markings on documents and other articles for subsequent identification. The jet ink composition comprises a fluorescent colorant, an ink carrier, and optionally one or more binder resins. The markings are invisible to the unaided eye and are visible only when excited by ultraviolet light. The colorant comprises a rare earth metal and a chelating ligand, is excitable by ultraviolet light having a wavelength of from about 275 nm to about 400 nm, and fluoresces at a wavelength of from about 550 nm to about 700 nm, with the proviso that when the rare earth metal is europium, dysprosium, or terbium, the chelating ligand is not dibenzoylmethane. The present invention further provides a method of identifying objects comprising providing a security marking as described above, exciting the marking and reading the fluorescent emission. The present invention also provides a system for identification of objects bearing the security markings.

66 Claims, No Drawings

INVISIBLE FLUORESCENT JET INK

CROSS-REFERENCE TO A RELATED APPLICATION

This application claims priority from the United States provisional patent application, Ser. No. 60/003,815, filed Sep. 15, 1995.

FIELD OF THE INVENTION

The present invention relates to fluorescent jet printing ink compositions suitable for bar coding, covert marking, or other security markings.

BACKGROUND OF THE INVENTION

There is a need for security marking on articles to prevent theft and fraud. Thus, security markings are needed on a variety of articles including envelopes, checks, bank-bills, shares, securities, stamps, identity cards, passports, tickets, certificates, and other articles. The security markings help prevent forgery of the articles. In addition, the invisible security markings can be applied anywhere on the article as opposed to the conventional black on white marking which is useful only on areas of white or other light colored background on articles.

The marking of articles with bar codes for identification and sorting is known. Infrared readable bar codes have been developed to meet the need for invisible security markings. For example, Japanese Patent Application Kokai No. 58-45999 discloses a method wherein a voting card is printed with an infrared absorbing bar code, and the printed area is covered by smearing with an ink which has high light absorptivity in the visible region but low light absorptivity in the infrared region.

This method has the problem of disagreeable visual image because of the black color of the ink which has low light absorptivity in the infrared region. This method also has the problem that it is incapable of perfectly concealing the bar code in order that it would be invisible to the unaided eye.

U.S. Pat. No. 5,366,252 discloses a method of concealing the infrared absorbing bar code. According to this invention, an infrared absorbing mark formed by printing on a substrate is covered up by smearing with an ink having high light absorptivity in the visible region and pervious to light in the infrared region, thus forming a colored concealing layer on the mark, and on this colored concealing layer there is further provided a white concealing layer by printing on the colored concealing layer with an ink containing a white pigment and an extender pigment of which at least part of the particles are those having an average size of 3 to 20 microns.

The aforesaid methods have the disadvantage that the infrared absorbing bar codes are visible to the unaided eye and need to be physically concealed. The concealment of the bar code results in covering up of a portion of the article, thereby adversely affecting the aesthetics of the article.

Fluorescent materials have been considered for marking purposes. It is known that fluorescence is the property of a material to emit radiation as the result of exposure to an excitation radiation from some other source. The emitted radiation persists only as long as the material is subjected to radiation. The fluorescent radiation generally has a wavelength longer than that of the excitation radiation.

There has been significant developmental activity in the area of fluorescent inks suitable for security markings. For example, U.S. Pat. No. 5,093,147 discloses a method for providing intelligible markings that are virtually invisible to the unaided eye on the surface of an article. The invention is based on a jet ink containing an organic laser dye that is poorly absorptive in the visible range of about 400 to 700 nm, is absorptive of radiation in the near infrared range of at least 750 nm, and fluoresces in response to radiation excitation in the infrared range at a wavelength longer than that of the exciting radiation.

U.S. Pat. No. 4,736,425 discloses a method of marking fiduciary documents requiring authentication by the use of certain fluorescent chelates. The method comprises introducing only a part of the elements forming the chelate onto the document to be marked and subsequently contacting the document for authentication purpose with the missing part of the elements forming the chelate to effect the synthesis of the fluorescent chelate. The chelate thus formed is excited by ultraviolet radiation and the fluorescence radiation is detected.

U.S. Pat. No. 4,450,595 discloses a jet ink that can be used to mark documents such as bank checks for automatic identification. The ink contains certain phenoxazine derivative dyes, to be visible to the unaided eye, and to fluoresce in the near infrared region (650 to 800 nm) upon activation using an activating light having a wavelength in the range of 550 to 700 nm. The ink that is visible to the unaided eye is unfortunately not suitable for many security marking applications.

Thus, there exists a need for fluorescent inks that are invisible to the unaided eye, are excitable in the ultraviolet region and fluoresce in the visible light range. In order to meet the above need, the colorant used to prepare the ink should not absorb significantly in the visible range of from 400 nm to about 700 nm. The colorant must be excitable by ultraviolet radiation having a wavelength of from about 275 nm to about 400 nm and fluoresce in the visible range.

Further, the fluorescence of any other materials present in the articles should not interfere with the fluorescence of the colorant. Certain optical brighteners are used in articles such as paper and textiles to improve the whiteness of the articles. Examples of such optical brighteners are well known and include 4,4'-bis(triazin-2-ylamino)stilbene-2,2'-disulfonic acids, 2-(stilben-4-yl)naphthotriazoles, 1,3-diphenyl-2-pyrazolines, and bis(benzoxazole-2-yl) derivatives. These and other optical brighteners are fluorescent whitening agents which absorb ultraviolet radiation in the range of from about 275 to about 400 nm and fluoresce in the range of from about 380 to about 500 nm, with peak fluorescent emission in the range of from about 420 to about 440 nm. It is preferable therefore, that the fluorescent wavelength of the colorant is greater than the wavelength of the fluorescent emission of the optical brighteners. Thus, it is preferred that the colorant fluoresce at a wavelength greater than about 575 nm.

Bar codes are generally applied by the method of jet printing. Ink jet printing is a well-known technique by which printing is accomplished without contact between the printing device and the substrate on which the printed characters are deposited. Briefly described, ink jet printing involves the technique of projecting a stream of ink droplets to a surface and controlling the direction of the stream electronically so that the droplets are caused to form the desired printed message on that surface.

Reviews of various aspects of ink jet printing can be found in these publications: Kuhn et al., *Scientific American*, April, 1979, 162–178; and Keeling, *Phys. Technol.*, 12 (5), 196–303 (1981). Various ink jet apparatuses are described in the following U.S. Pat. Nos. 3,060,429, 3,298,030, 3,373,437, 3,416,153, and 3,673,601.

In general, an ink jet ink composition must meet certain rigid requirements to be useful in ink jet printing operations. These relate to viscosity, resistivity, solubility, compatibility of components, and wettability of the substrate. Further, the ink must be quick-drying and smear resistant, resist rubbing, and be capable of passing through the ink jet nozzle without clogging, and permit rapid cleanup of the machine components with minimum effort.

Thus, in order to be able to produce security markings using fluorescent jet inks by jet printing, there exists a need for jet ink compositions meeting certain rigid requirements. There exists a need for jet ink compositions having suitable viscosity, resistivity, solubility, compatibility of components and wettability of the substrate. Further, there exists a need for a fluorescent jet ink composition that is quick-drying and smear resistant, resists rubbing, and is capable of passing through the ink jet nozzle without clogging, and permits rapid cleanup of the machine components with minimum effort. Further, there exists a need for a jet ink composition having a fluorescent colorant that is excitable by ultraviolet radiation in the wavelength range of from about 275 nm to about 400 nm and fluoresces in the visible range. There exists a further need for a jet ink composition that produces a mark that is invisible to the unaided eye, excitable by ultraviolet radiation, and fluoresces in the visible range, and preferably in the range of wavelength greater than the fluorescing wavelength of the optical brighteners and other additives present in the articles that may interfere with the fluorescence due to the colorant.

It is therefore an object of the present invention to provide an ink composition comprising a colorant that is excitable by ultraviolet radiation and fluoresces in the visible range. It is a further object of the present invention to provide a jet ink composition that provides a mark that is completely or substantially invisible to the unaided eye and when excited by ultraviolet light, fluoresces in the range of wavelength longer than the fluorescing wavelength of optical brighteners and other additives present in white substrates.

It is a further object of the present invention to provide an improved method of identifying objects, the method comprising jet printing a security mark on articles using a fluorescent jet ink such that the mark is invisible to the unaided eye and fluoresces in the visible range upon excitation by an activating light in the ultraviolet region.

These and other objects of the present invention will be apparent from the detailed description of the preferred embodiments of the invention set forth below.

SUMMARY OF THE INVENTION

The foregoing needs have been fulfilled to a great extent by the present invention which provides jet ink compositions comprising colorants that are excitable by ultraviolet radiation and fluoresce in the visible range. The colorant of the jet ink composition of the present invention preferably fluoresces in the range of wavelength greater than about 575 nm upon excitation by ultraviolet radiation. The present invention provides jet ink compositions comprising an ink carrier, a fluorescent colorant, and optionally one or more binder resins. The jet ink composition of the present invention is substantially invisible when printed on white or light colored substrates unless exposed to sufficient ultraviolet radiation. Additional ingredients such as electrolytes, humectants, and other additives also may be present.

The present invention provides a jet ink composition suitable for marking on white or light colored substrates comprising a colorant and an ink carrier, wherein the mark is completely or substantially invisible to the unaided eye and is visible only when excited by ultraviolet light, and the colorant comprises a rare earth metal and a chelating ligand, absorbs light at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

The present invention further provides a method of providing a mark on a substrate for subsequent identification comprising applying on the substrate an ink composition comprising an ink carrier, a colorant, and optionally one or more binder resins, wherein the mark is substantially invisible to the unaided eye and is visible only when excited by ultraviolet light in a wavelength of from about 275 nm to about 400 nm and fluoresces in a wavelength of from about 575 nm to about 700 nm, and removing all or substantially all the ink carrier by evaporation or absorption into the substrate.

The present invention also provides substrates having identifying markings for subsequent identification, wherein the markings are produced by jet printing onto the substrates an ink composition comprising a colorant, an ink carrier, and optionally one or more binder resins, wherein the markings are substantially invisible to the unaided eye and are visible only when excited by ultraviolet light, and wherein the colorant absorbs at a wavelength of from about 275 nm to about 400 nm and fluoresces at a wavelength of from about 575 nm to about 700 nm.

While the invention has been described and disclosed below in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

The present invention provides a jet ink composition suitable for providing a bar code or other security marking on articles, the ink composition comprising a colorant that is excitable by ultraviolet light and fluorescing in the visible range. The present invention further provides a jet ink composition that produces a marking that is substantially invisible to the unaided eye when printed on white substrates but which is visible only when excited by ultraviolet light and fluoresces in the range of wavelength longer than the wavelength of fluorescence of the optical brighteners used in white such as paper.

The present invention provides a jet ink composition suitable for marking on white or light colored substrates comprising a colorant and an ink carrier, wherein said mark is completely or substantially invisible to the unaided eye and is visible only when excited by ultraviolet light, and said colorant absorbs at a wavelength of from about 275 nm to about 400 nm, and fluoresces at a wavelength of from about 575 nm to 700 nm, with the proviso that the colorant does not include dysprosium, europium, or terbium dibenzoylmethide.

The present invention further provides a jet ink composition suitable for marking on white or light colored substrates comprising a colorant and an ink carrier, wherein the mark is completely or substantially invisible to the unaided eye and is visible only when excited by ultraviolet light, and the colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

The present invention further provides a jet ink composition suitable for printing a marking on white or light colored substrates, particularly non-porous substrates, comprising a colorant, an ink carrier, and one or more binder resins, wherein the mark is completely or substantially invisible to the unaided eye and is visible only when excited by ultraviolet light, the colorant comprises a rare earth metal and a chelating ligand, absorbs at a wavelength of from about 275 nm to about 400 nm, and fluoresces at a wavelength of from about 575 nm to about 700 nm, with the proviso that when the chelating ligand is dibenzoylmethane, the binder resin is not ethylcellulose or polyvinylbutyral.

The present invention further provides a method of identifying objects comprising the steps of (a) applying identifying security markings to the objects using a jet ink composition comprising a colorant, an ink carrier, and one or more binder resins, wherein the markings are completely or substantially invisible to the unaided eye and are visible only when excited by ultraviolet light, and wherein the colorant absorbs at a wavelength of from about 275 nm to about 400 nm and fluoresces at a wavelength of from about 575 nm to about 700 nm; (b) subjecting the objects to exciting radiation having a wavelength of from about 275 nm to about 400 nm; (c) reading the markings by detecting fluorescent radiation from the markings; and (d) identifying the objects in response to the reading of the markings.

The present invention further provides a system for marking items with a desired security mark for subsequent identification comprising a printing means for printing the mark on the items, wherein the printing means employs an ink composition comprising a colorant and an ink carrier, wherein the mark is completely or substantially invisible to the unaided eye and is visible only when excited by ultraviolet light, and the colorant comprises a rare earth metal and a chelating ligand, and absorbs at a wavelength of from about 275 nm to about 400 nm and fluoresces at a wavelength of from about 575 nm to about 700 nm, with the proviso that when the rare earth metal is europium, dysprosium, and terbium, the chelating ligand is not dibenzoylmethane. The marking system may additionally include a transport system to carry the items to the printing means. For example, the items can be carried under the print head of an ink jet printer using a conveyor belt.

The present invention further provides a method of providing a mark on a substrate for subsequent identification comprising applying onto the substrate an ink composition comprising a colorant and an ink carrier, wherein the mark is completely or substantially invisible to the unaided eye and is visible only when excited by ultraviolet light, and the colorant comprises a rare earth metal and a chelating ligand, and absorbs at a wavelength of from about 275 nm to about 400 nm and fluoresces at a wavelength of from about 575 nm to about 700 nm, and removing all or substantially all of the ink carrier by evaporation or absorption into the substrate, with the proviso that when the rare earth metal is europium, dysprosium, or terbium, the chelating ligand is not dibenzoylmethane.

The present invention further provides a system for identifying items with a security mark comprising an excitation means for exciting the mark produced as described above, by an ultraviolet light and a fluorescence detecting means for detecting the fluorescent emission of the mark. The system can include features and components generally known to those of ordinary skill in the art. See for example, U.S. Pat. No. 4,540,595. Thus, the system can include a transport means for transporting the items, such as a bank checks, to the reading means which consists of a source of radiation having the appropriate wavelength and intensity. The reading means includes a photodetector reads the fluorescent emission. If necessary, the system can include optical filters to eliminate or minimize undesired radiation.

The present invention further provides substrates having identifying markings produced by jet printing onto the substrates with an ink composition comprising an ink carrier and a colorant, wherein the markings are substantially invisible to the unaided eye and are visible only when excited by ultraviolet light, and the colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

The jet ink composition of the present invention, in general, exhibits the following characteristics for use in ink jet printing systems: (1) a Brookfield viscosity of from about 1.8 centipoises (cps) to about 6 cps at 25° C.; (2) an electrical resistivity of from about 20 ohm-cm to about 2,000 ohm-cm; and (3) a sonic velocity of from about 1200 meters/second to about 1700 meters/second.

The present invention provides a jet ink composition comprising an ink carrier, a fluorescent colorant, and optionally, one or more binder resins. The jet ink composition may further comprise other components such as a pH adjusting agent, a humectant, a biocide, and a defoamer.

The ink composition of the present invention can be prepared by any suitable method known to those of ordinary skill in the art. For example, the components of the composition can be combined and mixed in a suitable mixer or blender. A detailed discussion of each of the components, the characteristics of the inventive ink composition, and other aspects of the present invention is set forth below.

INK CARRIER

Any suitable ink carrier, including aqueous and organic carriers and combinations thereof, can be used to prepare the jet ink composition of the present invention. The carrier should have sufficient solubility for the various components of the ink composition. In addition, the carrier should be easily dissipatable from the printed article by evaporation and/or absorption in the substrate.

Examples of suitable organic carriers include alcohols, aldehydes, ketones, ethers, esters, nitrites, and amides. A pure organic solvent or a mixture containing one or more of these solvents can be used as a carrier. The ink carrier may comprise water in addition to one or more of the aforesaid organic solvents. For instance, a mixture of an alcohol and water can be used as the carrier. Any suitable combination of water and alcohol can be used. Examples of suitable alcohols include methanol, ethanol, propanols, and butanols. It has been found that when LUMILUX™ Red CD 331, Red CD 332, or Red CD 335, discussed below in greater detail, is used as the colorant, the aqueous carrier should contain at least 20% by weight of ethanol to completely solubilize the colorant.

Any suitable amount of ink carrier can be used. Typically the carrier is used in an amount of from about 50% weight to about 99% by weight, preferably in an amount of from about 80% by weight to about 97% weight of the composition. When water is used as the carrier, in order to prevent the clogging of ink jet tip by the dissolved impurities present in the water, it is preferred that deionized water is used in the preparation of the ink composition.

COLORANTS

The ink composition of the present invention comprises a suitable fluorescent colorant. Fluorescent colorants suitable for use in the present invention include pigments, dyes, and combinations thereof, that are excitable by ultraviolet radiation in the range of from about 275 nm to 400 nm and emit fluorescent radiation in the visible range. The preferred fluorescent colorants are invisible to the unaided eye (i.e., they have no significant absorption in the visible range of from about 400 nm to about 700 nm) and are excitable by ultraviolet radiation in the range of from about 275 nm to 400 nm and emit fluorescent radiation in the visible range. It is further preferred that when a white substrate is to be printed, the jet ink composition comprises a colorant which fluoresces in the range of wavelength greater than the fluorescent wavelength of the optical brighteners. The fluorescing wavelength is below about 700 nm, preferably below about 650 nm. Advantageously, the fluorescing wavelength ranges from about 575 nm to about 700 nm, and more preferably from about 600 nm to about 650 nm. Suitable pigments include organic and inorganic pigments. When the pigments are insoluble in the carrier, it is preferred that the median particle size of the pigment is small, preferably less than about 15 microns, and more preferably in the range of from about 0.2 microns to about 2 microns.

An example of a suitable class of pigments is rare earth metal chelates, and preferably, lanthanide chelates. Examples of lanthanide chelates include those formed by the chelation of organic ligands such as acetylacetone, benzoylacetone, dibenzoylmethane, and salicylic acid with lanthanide ions such as neodymium, europium, samarium, dysprosium, and terbium ions. Examples of such complexes include europium acetylacetonate, samarium acetylacetonate, neodymium benzoylacetonate, terbium salicylate, and dysprosium benzoylacetonate. The aforesaid chelates can be prepared by any suitable method known to those of ordinary skill in the art. For example, a ligand such as acetylacetone can be reacted under suitable conditions with a rare earth metal halide such as europium trichloride to produce the rare earth metal chelate. For additional details, see, e.g. , U.S. Pat. No. 4,736,425. The above chelates absorb ultraviolet radiation and fluoresce in the visible range. The acetylacetonate of europium fluoresces with an emission line in the red region and this is particularly suitable for printing on white or light colored substrates.

Examples of commercially available fluorescent pigments suitable for use in the ink composition of the present invention include, but are not limited to, the rare earth metal chelates sold as LUMILUX C™ pigments by Hoechst-Celanese Corp. in Reidel-de Haen, Germany.

The LUMILUX C rare earth metal organic chelates have a melting point of from about 130° C. to about 160° C. and a bulk density of from about 500 kg/M$^3$ to about 1100 kg/M$^3$. Examples of organic LUMILUX C pigments include Red CD 316, Red CD 331, Red CD 332, Red CD 335, and Red CD 339, which are yellowish when unexcited and fluoresce in the orange-red region when excited by ultraviolet radiation. These pigments are soluble in organic solvents. Red CD 331, a preferred pigment and a derivative of europium-acetonate, is a yellowish powder having an emission peak at 612 nm, a melting point in the range of 153–155° C., and a density of 600 kg/M$^3$. Red CD 331 is soluble in acetone, ethylacetate, ethanol, xylene, dichloromethane, dimethylformamide, n-hexane, and dibutylphthalate. Red 316 is a rare earth acetylacetonate. Red CD 332, a rare earth biketonate, has a melting of 135–138° C. and a density of 500 kg/M$^3$. Red CD 335, an europium chelate, has a melting point of 133° C. and a density of 1030 kg/m$^3$.

Additional examples of suitable LUMILUX pigments include Red CD 105, Red CD 106, Red CD 120, and Red CD 131. These are inorganic pigments. Red CD 105 is white when unexcited, fluoresces in the orange-red region when excited by ultraviolet radiation, and has a median particle size of 7 microns. Red CD 106 is white when unexcited, fluoresces in the orange-red region when excited by ultraviolet radiation, and has a median particle size of 6 microns. Red CD 120 is white when unexcited, fluoresces in the red region when excited by ultraviolet radiation, and has a median particle size of 2.7 microns. Red CD 131 is white when unexcited, fluoresces in the red region when excited by ultraviolet radiation, and has a median particle size of 6.5 microns. It is preferred that the particle size of the aforesaid pigments is further reduced by suitable means including grinding and crushing for use in the preparation of the jet ink composition.

Any suitable amount of the colorant can be used to prepare the jet ink composition of the present invention. If the ultraviolet absorptivity or the fluorescent emission intensity is high, then a small amount of the colorant is sufficient. If the ultraviolet absorptivity or the fluorescent emission intensity is low, then the amount of the colorant used should be increased. The colorant is used preferably in an amount of from about 0.1% by weight to about 2% by weight, and more preferably in an amount of from about 0.5% by weight to about 1.6% by weight of the jet ink composition. Excessive amount of colorant will increase the cost of the ink composition.

BINDER RESINS

The jet ink composition of the present invention may optionally comprise one or more binder resins. The binder resin serves to immobilize or increase the adhesion of the colorant, particularly on non-porous articles such as plastic and glassine materials. Any suitable binder resins can be used. It is preferred that the binder resin is soluble in the ink carrier. It is further preferred that the binder resin has sufficient adhesion to the substrate following the dissipation of the ink carrier. It is further preferred that the binder resin does not adversely affect the fluorescent wavelength or the intensity of the fluorescent emission.

Examples of suitable binder resins include polyvinylpyrrolidone, polyurethane, polyvinylalcohol, polyvinylbutyral, polycaprolactone, polyethyleneglycol esters of fatty acids such as malonic acid, succinic acid, adipic acid, stearic acid, oleic acid, and the like, polystyrene, poly-α-methylstyrene, polyalkenes such as polyethylene, polypropylene, and polybutylene, oxidized polyalkylenes such as oxidized polyethylene, copolymers of polyethylene with vinyl acetate, polysulfones, polyesters, polycarbonates, polysiloxanes, poly(4-methyl-1-pentene), styrene-acrylic copolymers, polyacrylates such as polymethylacrylate, polyethylacrylate, polypropylacrylate, polymethylmethacrylate, polyethylmethacrylate, polypropylmethacrylate, and the like, polymethylvinylether, poly(methylvinylether-co-maleic acid), poly (methylvinylether-co-maleic ester), and poly (methylvinylether-co-maleic anhydride). Further examples of binder resins include cellulose derivatives. Thus, cellulose ethers such as methylcellulose, ethylcellulose, propylcellulose, hydroxyethylcellulose, hydroxypropylcellulose, hydroxypropylmethylcellulose, and sodium carboxymethylcellulose, and cellulose esters such as cellulose acetate and cellulose acetate propionate, and the like, can be employed as binder resins. Ethylcellulose is a preferred cellulose derivative.

Ethylcellulose can be prepared by any method known to those of ordinary skill in the art, including by the reaction of ethyl chloride with alkali treated cellulose. Ethylcellulose is commercially available from Dow Chemical Co. in Midland, Mich., as ETHOCEL™, in several grades. The ethoxyl content of ethylcellulose ranges from 45.0% to 52.0% by weight of ethylcellulose. The most common ones have an ethoxyl content of 45.0% to 49.5%, corresponding to the degree of substitution of 2.25 to 2.58 ethoxy groups per anhydroglucose unit. The "Standard" grade ETHOCEL has an ethoxyl content of 48.0% to 49.5%, and the "Medium" grade ETHOCEL has an ethoxyl content of 45.0% to 47.0% by weight of ethylcellulose. The ETHOCELs are available in a variety of molecular weights as reflected by the various viscosities of the polymers which range from about 3 to about 220 cps when measured as follows. The viscosity was measured as 5% solutions at 25° C. in an Ubbelohde viscometer, in a solvent of 60% toluene and 40% ethanol for Medium products, and in a solvent of 80% toluene and 20% ethanol for Standard products. Thus, Standard #4 has a viscosity of 3–5.5 cps, Standard #7 has a viscosity of 6–8 cps, Standard #10 has a viscosity of 9–11 cps, Standard #20 has a viscosity of 18–22 cps, and Standard #45 has a viscosity of 41–49 cps, and Medium #50 has a viscosity of 45–55 cps, Medium #70 has a viscosity of 63–85 cps, Medium #100 has a viscosity of 90–110 cps. Standard #4 ETHOCEL is a preferred ethylcellulose binder resin. Several of the above ETHOCELs are available in Premium and Industrial grades.

Cellulose nitrate, another preferred binder resin, is the reaction product of cellulose and nitric acid. Various grades of cellulose nitrate are characterized by the degree of substitution by nitro groups of the hydroxyl groups of cellulose. Cellulose nitrates which are useful in the present invention include any of a wide variety of cellulose nitrates including those which are commercially available. For example, cellulose nitrate can be obtained from Scholle Corp. in College Park, Ga.

Styrene-acrylic copolymers also can be used as binder resins. Examples of styrene-acrylic copolymers include the JONCRYL™ brand materials available from S.C. Johnson & Co. in Racine, Wis. Examples of JONCRYL styrene-acrylics are the JONCRYL 555, 586, 678, 680, 682, 683, and 67, which are water solubilized copolymers of styrene, alpha methylstyrene, and acrylic acid.

Polyvinylpyrrolidone (PVP) is a preferred binder resin, particularly when used in combination with polyurethane binder resin. Any suitable PVP that has the desired solubility can be utilized in the preparation of the jet ink of the present invention. PVP can be prepared by the polymerization of N-vinylpyrrolidone monomer by methods known to those of ordinary skill in the art, including free radical or redox polymerization methods. An example of a suitable commercially available PVP is the POVIDONE™ USP grade PVP, sold as PLASDONE™ brand PVP by GAF Chemicals Corp. in Wayne, N.J. PLASDONE PVP is available in several types, ranging in molecular weight from about 8,000 to about 1,200,000 Daltons, including the K-25, K-26/28, K-29/32, C-15, C-30, and K-90 types. K values of K-25, K-26/28, K-29/32, C-15, C-30, and K-90, are respectively, 25, 26–28, 29–32, 15, 30, and 90. The C grade PVP is pyrogen-free. The K-value is related to the intrinsic viscosity [η] and molecular weight of the polymer by the following expressions:

$$[\eta]=2.303 \ (0.001 \ K +0.000075 \ K^2)$$

$$[\eta]=kMv^a,$$

where Mv is the viscosity average molecular weight, k=1.4× $10^{-4}$, and a=0.7.

PVP of viscosity average molecular weight in the range of about 20,000 to about 50,000 Daltons is referred. K-29/32 is a preferred PVP, having a viscosity average molecular weight of approximately 38,000 Daltons. An example of a suitable PVP that is commercially available is the PVP K-30 from ISP Technologies in Wayne, N.J. PVP K-30 is soluble in common solvents such as alcohol and water.

It has been found that the use of a combination of binder resins in the inventive ink composition is advantageous. The fluorescent emission intensity is sustainable to a greater extent when a combination of binder resins is used. Higher emission intensities and better print quality can be obtained while using a combination of more than one binder resin than while using a single binder resin. Thus, when a combination of PVP and polyurethane was employed as the binder resin, higher emission intensities and better print quality were obtained. The improvement in print quality led to better adhesion and more uniform drop placement, particularly on non-porous portions of mail that required bar coding. Examples of the non-porous portions include plastic and glassine type materials.

Flexible thermoplastic polyurethane resins can be used as binder resin in the preparation of the ink compositions of the instant invention. Flexible thermoplastic polyurethane resins are produced by the reaction of diols and diisocyanates. Examples of diols include ethylene glycol, propylene glycol, propanediol, butanediol, polyethyleneglycol, polypropyleneglycol, polyethyleneglycol adipate diol, polyethyleneglycol succinate diol, polytetrahydrofuran diol, and the like. Examples of diisocyanates include 2,4-tolylene diisocyanate, 2,6-tolylene diisocyanate, 4,4'-diphenylmethane diisocyanate, hexamethylene diisocyanate, and the like. Polyurethanes made from polypropylene glycol and 4,4'-diphenylmethane diisocyanate are preferred.

Polyurethanes having weight average molecular weight in the range of from about 4,000 to about 12,000 are preferred and polyurethanes having weight average molecular weight in the range of from about 7,000 to about 9,000 are further preferred.

Examples of preferred polyurethanes that are useful in the present invention include, but are not limited to, the flexible thermoplastic polyurethane solutions sold under the commercial name of SURKOPAK™ by Kane International Corp. (Mitchanol), Rye, N.Y. Several grades of polyurethanes are sold under this name and include SURKOPAK 2135, SURKOPAK 5299, SURKOPAK 5244, SURKOPAK 5255, SURKOPAK 2X, SURKOPAK 5322, SURKOPAK 5311, and SURKOPAK XL. The physical properties of the polyurethane solutions are presented in Table 1 below.

TABLE 1

Properties of the SURKOPAK Polyurethane Resins

| Grade | 2135 | 5299 | 5244* | 5255 | 2X | 5322** | 5311 | XL |
|---|---|---|---|---|---|---|---|---|
| Solids % | 80–85 | 80–85 | 73–78 | 73–78 | 65–70 | 68–73 | 63–68 | 68–73 |
| Viscosity | 15–25 | 25–30 | 12–16 | 25–30 | 40–50 | 6–8 | 30–40 | 15–20 |
| Solvent | A | A | E | E | E | E/A | E | E/A |
| Flash Point, °C. | 12 | 12 | −4 | −4 | −4 | −4 | −4 | −4 |

A = Alcohol; E = Ester; E/A = Mixture of E and A
*Weight Average Molecular Weight Range 18,000–22,000
**Weight Average Molecular Weight Range 7,000–9,000

These SURKOPAK polyurethanes are non-reactive and are essentially free of isocyanate groups. Among these preferred polyurethane solutions, SURKOPAK 5322 and SURKOPAK 5244 are further preferred. SURKOPAK 5322, a polyurethane composed of polypropylene glycol and 4,4'-diphenylmethane diisocyanate, is sold as a solution in a mixed solvent containing ethyl acetate and isopropanol.

Any suitable amount of the binder resin can be used in the preparation of the jet ink composition. The binder resin is used preferably in an amount of from about 1% by weight to about 15% by weight of the ink composition, and more preferably in an amount of from about 1% by weight to about 13% by weight of the jet ink composition. When a combination of polyurethane and another binder resin is used, any suitable combination can be used, preferably the polyurethane resin is in excess over the other resin. For example, when PVP and polyurethane are used in the combination, the PVP is used in an amount of 1–2% by weight of the ink composition and the polyurethane is used in an amount of from about 3–10% by weight of the ink composition. Excessive amount of the binder resin may adversely affect the viscosity of the jet ink composition.

ELECTROLYTES

The jet ink composition of the present invention may further comprise an electrolyte to obtain the desired electrical resistivity of the jet ink composition. Any suitable electrolyte known to those of ordinary skill in the art can be used. Examples of suitable electrolytes include alkali and alkaline earth metal salts such as lithium nitrate, lithium chloride, lithium thiocyanate, sodium chloride, potassium chloride, potassium bromide, calcium chloride, and the like, and amine salts such as ammonium nitrate, ammonium chloride, dimethylamine hydrochloride, hydroxylamine hydrochloride, and the like.

Any suitable amount of the electrolyte can be used to achieve the desired electrical resistivity. The electrolyte is preferably present in the jet ink composition in the range of from about 0.1% to about 2% by weight of the jet ink composition, and more preferably in the range of from about 0.4% by weight to about 0.6% by weight of the jet ink composition. Excessive amounts of electrolyte may cause clogging of the jet nozzle and adversely affect the electrical resistivity of the jet ink composition.

pH ADJUSTING AGENTS

The jet ink composition of the present invention may comprise a pH adjusting agent if needed for the dissolution of the binder resin or the colorant. The desired pH will be dependent upon the particular solvent used and also to some extent upon the other components employed. Any suitable pH adjusting agent, acid or base, can be used so as to maintain the pH of the ink composition in the range of from about 4.0 to about 8.0, preferably in the range of from about 4.5 to about 7.5.

HUMECTANTS

The jet ink composition of the present invention may preferably comprise a humectant to prevent drying of the ink during the printing operation, as well as during storage of the ink. Humectants are hydrophilic solvents having high boiling points, preferably above 100° C., and more preferably in the range of from about 150° C. to about 250° C. Any suitable humectant known to those of ordinary skill in the art can be used. Examples of suitable humectants include glycols such as ethylene glycol, propylene glycol, glycerin, diglycerin, diethylene glycol, and the like, glycol ethers such as ethylene glycol dimethyl ether, ethylene glycol diethylether, cellosolve, diethylene glycol monoethylether (Carbitol), diethylene glycol dimethylether, and diethylene glycol diethylether, dialkylsulfoxides such as dimethylsulfoxide, and other solvents such as sulfolane, N-methylpyrrolidinone, and the like. Preferred humectants include propylene glycol and diethyleneglycol monoethylether.

Any suitable amount of the humectant can be used, preferably in an amount of from about 0.5% by weight to about 5% by weight of the ink composition, and more preferably in the amount of from about 1% by weight to about 3% by weight of the ink composition. Excessive use of the humectant is to be avoided because it will increase the toxicity and/or the viscosity of the jet ink.

BIOCIDES

The ink composition of the present invention may additionally comprise a suitable biocide to prevent growth of bacteria, mould or fungus. Any suitable biocide can be used. DOWICIL™ 150, 200, and 75, benzoate salts, sorbate salts, and the like, methyl p-hydroxybenzoate (Methyl Paraben) and 6-acetoxy-2,2-dimethyl-1,3-dioxane (available as Giv Gard DXN from Givaudam Corp.) are examples of suitable biocides. The biocide can be present in the ink of the instant invention in an amount sufficient to prevent the attack by bacteria, mould, and fungus, which amount can be in the range of from about 0.05% by weight to about 0.5% by weight, preferably in the amount of from about 0.1% by weight of to about 0.3% by weight of the jet ink composition.

DEFOAMERS

The jet ink composition of the present invention may preferably comprise a defoamer to prevent foaming of the ink during its preparation, as well as during the printing operation. Any suitable defoamer known to those of ordinary skill in the art can be used, preferably those that are miscible with the ink carrier.

Suitable defoamers include silicone defoamers and acetylenic defoamers. Examples of commercially available defoamers include silicone defoamers, such as DC-150, which can be obtained from Dow Corning Co., and SILVET I-5 77, 720, 722, or 7002, which can be obtained from Union Carbide Co. A preferred defoamer is XRM-3588E™, which can be obtained from Ultra Additives Inc., in Paterson, New Jersey. XRM-3588E is a defoamer generally used in metal cutting fluids, and has a Brookfield (RVF Spindle #4, 20 RPM, 25° C.) viscosity of 6,000 to 9,000 centipoises, a specific gravity of 0.984–1.032, and a pH of 7.0–8.5 (50% solution). The chemistry of XRM-3588E has not been published, and is believed to be a silicone defoamer.

Examples of suitable acetylenic defoamers include the SURFYNOL™ brand defoamers which can be obtained from Air Products and Chemical Co. in Allentown, Pa. A number of Surfynol defoamers are available, including the preferred Surfynol 104 (2,4,7,9-tetramethyl-5-decyn-4,7-diol), which is available as a solution in a variety of solvents as Surfynol 104A, Surfynol 104E, Surfynol 104H, and Surfynol 104BC, and other Surfynols such as Surfynol GA, Surfynol SE, Surfynol TG, Surfynol PC, the dimethyl hexynediol, Surfynol 61, the dimethyl octynediol, Surfynol 82, the ethoxylated derivatives of the tetramethyl decynediol, Surfynol 440, Surfynol 465, and Surfynol 485, all of which can be used in the instant invention.

Any suitable amount of the defoamer effective to prevent foaming of the jet ink during preparation and use can be used. The amount used is preferably in the range of from about 0.01% by weight to about 1% by weight of the ink composition, and more preferably in the range of from about 0.05% by weight to about 0.35% by weight of the ink composition. The weight percentages given above refer to that of the active ingredient, and if the defoamer is sold in a diluted form, the amount of the diluted defoamer used will be proportionately increased. Excessive use of the defoamers is to be avoided because it may adversely affect the print quality such as the adhesion of the bar code to the substrate.

The jet ink composition of the present invention can be printed on any suitable substrate, including plain paper, KRAFT™ paper, bond paper such as GILBERT™ 25% or 100% cotton bond paper, silica coated paper, transparency materials, fabrics, plastics, polymeric films, and the like.

The following examples further illustrate the present invention but, of course, should not be construed as in any way limiting its scope.

EXAMPLE 1

This example illustrates the preparation of an ink composition of the present invention using LUMILUX CD 331 as the pigment.

The following components were combined and mixed using an air mixer until a homogeneous ink composition was obtained.

| Component | % (weight) |
| --- | --- |
| Ethanol CDA 19 (200 Proof) | 96.2 |
| LUMILUX Red CD 331 (Hoechst-Celanese) | 0.8 |
| Polyvinylpyrrolidone (ISP Corp.) | 2.5 |
| Lithium nitrate | 0.5 |
|  | 100.0 |

The above ink was used in a VIDEOJET™ printer, and bar codes were printed on a white uncoated plain paper substrate. The code was invisible to the unaided eye, and, when the code was exposed to ultraviolet light radiation having a wavelength of 350–365 nm, the code appeared red due to the fluorescence at 612 nm.

EXAMPLE 2

This Example illustrates the preparation of certain additional embodiments of jet ink composition of the present invention. These embodiments include additional LUMILUX C dyes and additional binding agents, as shown in Table 2.

All formulations set forth in Table 2 gave satisfactory performance when tested using a VIDEOJET printer on plain paper and glassine materials. Formulation 10 gave a particularly superior performance by offering the highest emission intensity for a given amount of the dye.

TABLE 2

Representative Formulations of Invisible Fluorescent Jet Ink Compositions

| Formulation No. | 1 | 2 | 3 | 4 | 5 | 6 | 7 | 8 | 9 | 10 | Supplier |
| --- | --- | --- | --- | --- | --- | --- | --- | --- | --- | --- | --- |
| Ethanol CDA 19–200 proof | 96.2 | 96.2 | 95.2 | 96.2 | 88.7 | 95.4 | 91.1 | 90.3 | 81.4 | 85.05 | ASHLAND |
| Deionized water | — | — | — | — | — | — | — | — | 10 | — | — |
| Polyvinylpyrrolidone K30 | 2.5 | 2.5 | — | — | — | 2.5 | 1.25 | — | 1.2 | 2 | GAF |
| SURKOPAK 5322[1] | — | — | — | — | — | — | 5.5 | — | 5.5 | 11 | MITCHANOL |
| SURKOPAK 5244[2] | — | — | — | — | 10 | — | — | — | — | — | MITCHANOL |
| JONCRYL 67 acrylic resin | — | — | 3.5 | — | — | — | — | — | — | — | JOHNSON WAX |
| Ethylcellulose Std 4 resin | — | — | — | 2.5 | — | — | — | — | — | — | DOW CHEMICAL |
| Nitrocellulose resin[3] | — | — | — | — | — | — | — | 7.5 | — | — | Scholle Corp. |
| LUMILUX Red CD331 | 0.8 | — | 0.8 | 0.8 | 0.8 | 1.6 | — | 1.6 | 1.6 | — | Riedel-de Haen |
| LUMILUX Red CD332 | — | — | — | — | — | — | 1.6 | — | — | 1.35 | Riedel-de Haen |
| LUMILUX Red CD335 | — | 0.8 | — | — | — | — | — | — | — | — | Riedel-de Haen |
| Lithium nitrate | 0.5 | 0.5 | 0.5 | 0.5 | 0.5 | 0.5 | 0.55 | 0.6 | 0.3 | 0.6 | FMC |
| Total (by weight) | 100 | 100 | 100 | 100 | 100 | 100 | 100 | 100 | 100 | 100 |  |
| Physical Properties |  |  |  |  |  |  |  |  |  |  |  |
| Viscosity (cps) | 2.15 | 2.1 | 2.5 | 4 | 2.7 | 2 | 1.9 | 2.2 | 2.5 | 3.2 |  |
| pH | 6.1 | 5.9 | 5 | 5.5 | 6.8 | 6.2 | 6.2 | 6.2 | 6.9 | 5.9 |  |
| Resistivity (ohm/cm) | 950 | 1002 | 1100 | 1100 | 1056 | 1050 | 1020 | 956 | 1199 | 1080 |  |

[1]Polyurethane solution of approx. 68–73% by wt.
[2]Polyurethane solution of approx. 73–78% by wt.
[3]Solution of nitrocellulose 35% by wt., isopropanol 15% by wt., ethylacetate 15%, and ethanol 35%, by weight.

The present invention further provides an improved method of identifying objects comprising providing a security marking on the objects, exciting the marking with an excitation radiation to obtain an emission radiation, and reading the emission radiation, the improvement comprising providing a securing marking using a jet ink composition comprising a colorant and an ink carrier, wherein the marking is completely or substantially invisible to the unaided eye and is visible only when excited by ultraviolet light, and the colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

The present invention further provides a method of producing invisible jet printed bar codes on white substrates such as white paper, the method comprising directing a stream of droplets containing the jet ink composition of the present invention onto the substrate to be coded and electronically controlling the direction of the droplets.

All of the references, including patents, patent applications, and publications, cited herein are hereby incorporated in their entireties by reference.

While this invention has been described with an emphasis upon the preferred embodiment, it will be obvious to those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

What is claimed is:

1. A jet ink composition suitable for providing a mark on white or light colored substrates, wherein said composition comprises a colorant and an ink carrier and has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, wherein said mark is completely or substantially invisible to the unaided eye and is visible only when excited by ultraviolet light, and said colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

2. The jet ink composition of claim 1, wherein said chelating ligand is a biketonate, acetonate, or salicylate.

3. The jet ink composition of claim 2, wherein said chelating ligand is selected from the group consisting of acetylacetone, benzoylacetone, dibenzoylmethane, and salicylic acid.

4. The jet ink composition of claim 3, wherein said chelating ligand is acetylacetone.

5. The jet ink composition of claim 4, wherein said rare earth metal is selected from the group consisting of neodymium, europium, samarium, terbium, dysprosium, and terbium.

6. The jet ink composition of claim 5, wherein said colorant is selected from the group consisting of europium acetylacetonate, samarium acetylacetonate, neodymium benzoylacetonate, terbium salicylate, and dysprosium benzoylacetonate.

7. The jet ink composition of claim 6, wherein said colorant is europium acetylacetonate.

8. The jet ink composition of claim 7, further comprising one or more binder resins.

9. The jet ink composition of claim 8, wherein said binder resin is selected from the group consisting of polyurethane, polyvinylpyrrolidone, styrene-acrylic copolymer, nitrocellulose, and ethylcellulose.

10. The jet ink composition of claim 9, wherein said ink carrier comprises an organic solvent.

11. The jet ink composition of claim 10, wherein said organic solvent comprises an alcohol.

12. The jet ink composition of claim 11, further comprising an electrolyte.

13. The jet ink composition of claim 12, wherein said electrolyte comprises lithium nitrate.

14. The jet ink composition of claim 13, wherein said alcohol is ethanol and is present in an amount of from about 80% by weight to about 97% by weight of said ink composition, said colorant is a lanthanide chelate and is present in an amount of from about 0.1% by weight to about 2%. by weight of said ink composition, said binder resin is present in an amount of from about 1% by weight to about 15% by weight of said ink composition, and said lithium nitrate is present in an amount of from about 0.4% by weight to about 0.6% by weight of said ink composition.

15. A jet ink composition suitable for printing a mark on white or light colored substrates, wherein said composition comprises a colorant, an ink carrier, and one or more binder resins and has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, wherein said mark is completely or substantially invisible to the unaided eye and is visible only when excited by ultraviolet light, and said colorant comprises a rare earth metal and a chelating ligand, absorbs at a wavelength of from about 275 nm to about 400 nm, and fluoresces at a wavelength of from about 575 nm to about 700 nm, with the proviso that when the chelating ligand is dibenzoylmethane, the binder resin is not ethylcellulose or polyvinylbutyral.

16. The jet ink composition of claim 15, wherein said chelating ligand is a biketonate, acetonate, or salicylate.

17. The jet ink composition of claim 16, wherein aid chelating ligand is selected from the group consisting of acetylacetone, benzoylacetone, dibenzoylmethane, and salicylic acid.

18. The jet ink composition of claim 17, wherein aid chelating ligand is acetylacetone.

19. The jet ink composition of claim 18, wherein said colorant is europium acetylacetonate.

20. The jet ink composition of claim 19, wherein said ink carrier comprises an organic solvent.

21. The jet ink composition of claim 20, wherein said organic solvent comprises an alcohol.

22. The jet ink composition of claim 21, further comprising an electrolyte.

23. The jet ink composition of claim 22, wherein said electrolyte comprises lithium nitrate.

24. The jet ink composition of claim 23, wherein said binder resin is selected from the group consisting of polyurethane, polyvinylpyrrolidone, styrene-acrylic copolymer, nitrocellulose, and ethylcellulose.

25. The jet ink composition of claim 24, wherein said ink composition comprises polyvinylpyrrolidone and polyurethane as binder resins.

26. The jet ink composition of claim 25, wherein said alcohol is ethanol and is present in an amount of from about 80% by weight to about 97% by weight of said ink composition, said colorant is a lanthanide chelate and is present in an amount of from about 0.1% by weight to about 2% by weight of said ink composition, said polyvinylpyrrolidone in an amount of from about 1% by weight to about 2% by weight of said ink composition, said polyurethane in an amount of from about 5% by weight to about 13% by weight of said ink composition, and said lithium nitrate in an amount of from about 0.4% by weight to about 0.6% by weight of said ink composition.

27. A system for marking items with a mark for subsequent identification comprising a printing means for printing said mark on said items, wherein said printing means employs an ink composition, wherein said composition comprises a colorant and an ink carrier and has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, wherein said mark is completely or substantially invisible to the unaided eye and is visible only when excited by ultraviolet light, and said colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, and terbium, the chelating ligand is not dibenzoylmethane.

28. The system of claim 27, wherein said printing means comprises a jet printer.

29. The system of claim 28, wherein said rare earth metal comprises a lanthanide.

30. The system of claim 29, wherein said chelating ligand is a biketonate.

31. The system of claim 30, wherein said colorant is an europium biketonate.

32. The system of claim 31, wherein said ink composition further comprises one or more binder resins.

33. A system for identifying items with a security mark said system comprising an excitation means for exciting said mark and a fluorescence detecting means for detecting the fluorescent emission of said mark, wherein said mark comprises an ink composition, wherein said composition comprises a colorant and an ink carrier, has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, is completely or substantially invisible to the unaided eye, and is visible only when excited by ultraviolet light, and wherein said colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, and terbium, the chelating ligand is not dibenzoylmethane.

34. A method of providing a mark on a substrate for subsequent identification comprising applying onto said substrate an ink composition, wherein said composition comprises a colorant and an ink carrier and has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, wherein said mark is completely or substantially invisible to the unaided eye and is visible only when excited by ultraviolet light, and said colorant comprises a rare earth metal and a chelating ligand, absorbs at a wavelength of from about 275 nm to about 400 nm, and fluoresces at a wavelength of from about 575 nm to about 700 nm, and removing all or substantially all of said ink carrier by evaporation or absorption into said substrate, with the proviso that when the rare earth metal is europium, dysprosium, or terbium, the chelating ligand is not dibenzoylmethane.

35. The method of claim 34, wherein said ink composition is applied to said substrate using a jet printer.

36. The method of claim 35, wherein said rare earth metal comprises a lanthanide.

37. The method of claim 36, wherein said chelating ligand is a biketonate or acetonate.

38. The method of claim 37, wherein said colorant is europium acetylacetonate.

39. The method of claim 38, wherein said ink carrier comprises an organic solvent.

40. The method of claim 39, wherein said organic solvent comprises an alcohol.

41. The method of claim 40, wherein said ink composition further comprises an electrolyte.

42. The method of claim 41, wherein said ink composition further comprises one or more binder resins.

43. The method of claim 42, wherein said binder resin is selected from the group consisting of polyurethane, polyvinylpyrrolidone, styrene-acrylic, nitrocellulose, and ethylcellulose.

44. The method of claim 42, wherein said composition comprises polyurethane and polyvinylpyrrolidone as binder resins.

45. The method of claim 34, wherein said substrate is selected from the group consisting of envelopes, checks, bank bills, shares, securities, identity cards, passports, tickets, and certificates.

46. A mark provided on a substrate for subsequent identification wherein said mark is completely or substantially invisible to the unaided eye, is visible only when excited by ultraviolet light, and absorbs light at a wavelength of from about 275 nm to about 400 nm, and fluoresces light at a wavelength of from about 575 nm to about 700 nm, wherein said mark is provided by an ink composition, wherein said composition comprises a colorant and an ink carrier and has a viscosity of from about 1.8 cps to about 6 cps at 25° C., an electrical resistivity of from about 20 ohm-cm to about 2,000 ohm-cm, and a sonic velocity of from about 1200 meters/second to about 1700 meters/second, wherein said colorant comprises a rare earth metal and a chelating ligand, with the proviso that when the rare earth metal is europium, dysprosium, or terbium, the chelating ligand is not dibenzoylmethane.

47. The mark of claim 46, wherein said colorant is europium acetylacetonate, said ink carrier comprises an alcohol solvent, said ink composition further comprises an electrolyte and a binder resin, and said binder resin is selected from the group consisting of polyurethane, polyvinylpyrrolidone, styrene-acrylic, nitrocellulose, and ethylcellulose.

48. The mark of claim 47, wherein said binder resin is selected from the group consisting of polyurethane and polyvinylpyrrolidone, and said substrate is selected from the group consisting of envelopes, checks, bank bills, shares, securities, identity cards, passports, tickets, and certificates.

49. A method of identifying objects comprising the steps of (a) applying identifying markings to said objects using a jet ink composition, wherein said composition comprises a colorant and an ink carrier, has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, wherein said mark is completely or substantially invisible to the unaided eye and is visible only when excited by ultraviolet light, and said colorant comprises a rare earth metal and a chelating ligand, absorbs at a wavelength of from about 275 nm to about 400 nm, and fluoresces at a wavelength of from about 575 nm to about 700 nm, and removing all or substantially all of said ink carrier by evaporation or absorption into said substrate, with the proviso that when the rare earth metal is europium, dysprosium, or terbium, the chelating ligand is not dibenzoylmethane; (b) subjecting said objects to exciting radiation having a wavelength of from about 275 nm to about 400 nm; (c) reading said markings by detecting fluorescent radiation from said markings; and (d) identifying said objects in response to the reading of said markings.

50. The method of claim 49, wherein said chelating ligand comprises a biketonate or acetonate.

51. The method of claim 50, wherein said colorant is a lanthanide chelate comprising europium acetylacetonate.

52. The method of claim 51, wherein said ink composition further comprises one or more binder resins.

53. The method of claim 52, wherein said binder resin is selected from the group consisting of polyurethane, polyvinylpyrrolidone, styrene-acrylic, nitrocellulose, and ethylcellulose.

54. The method of claim 53, wherein said object is selected from the group consisting of envelopes, checks, bank bills, shares, securities, identity cards, passports, tickets, and certificates.

55. A substrate having identifying markings produced by jet printing onto said substrate an ink composition, wherein said composition comprises a colorant and an ink carrier and has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, wherein said markings are substantially invisible to the unaided eye and are visible only when excited by ultraviolet light, and said colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

56. The substrate of claim 55, wherein said chelating ligand comprises a biketonate or acetonate.

57. The substrate of claim 56, wherein said colorant is a lanthanide chelate comprising europium acetylacetonate.

58. The substrate of claim 57, wherein said ink composition further comprises one or more binder resins.

59. The substrate of claim 58, wherein said binder resin is selected from the group consisting of polyvinylpyrrolidone, polyurethane, styrene-acrylic, nitrocellulose, and ethylcellulose.

60. The substrate of claim 59, wherein said substrate is selected from the group consisting of envelopes, checks, bank bills, shares, securities, identity cards, passports, tickets, and certificates.

61. A jet ink composition suitable for marking on white or light colored substrates, wherein said composition comprises a colorant and an ink carrier and has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, wherein said mark is completely or substantially invisible to the unaided eye and is visible only when excited by ultraviolet light, and said colorant absorbs at a wavelength of from about 275 nm to about 400 nm, and fluoresces at a wavelength of from about 575 nm to about 700 nm, with the proviso that the colorant does not include dysprosium, europium, or terbium dibenzoylmethide.

62. A jet ink composition suitable for marking on white or light colored substrates comprising a colorant, an ink carrier, a polyurethane resin and at least one other resin wherein said jet ink composition has a viscosity of from about 1.8 centipoises (cps) to about 6 cps at 25° C., an electrical resistivity of from about 20 ohm-cm to about 2,000 ohm-cm, and a sonic velocity of from about 1200 meters/second to about 1700 meters/second, and said mark is completely or substantially invisible to the unaided eye and is visible only when excited by ultraviolet light, and said colorant comprises a rare earth metal and a chelating ligand, absorbs at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

63. The jet ink composition of claim 62, wherein said chelating ligand is a biketonate, acetonate, or salicyate.

64. The jet ink composition of claim 63, wherein said chelating ligand is selected from the group consisting of acetylacetone, benzoylacetone, dibenzoylmethane, and salicylic acid.

65. The jet ink composition of claim 62, wherein said other resin is selected from the group consisting of polyvinylpyrrolidone, styrene-acrylic copolymer, nitrocellulose, and ethylcellulose.

66. A jet ink composition suitable for marking on white a light colored substrate wherein said composition comprises a colorant, an ink carrier, a polyurethane resin and at least one other resin, and has a viscosity of from about 1.8 centipoises (cps) to about 6 cps at 25° C., an electrical resistivity of from about 20 ohm-cm to about 2000 ohm cm, and a sonic velocity of from about 1200 meter/second to about 1700 meters/second, and wherein said mark is completely or substantially invisible to the unaided eye and is visible only when excited by ultraviolet light, and said colorant absorbs at a wavelength of from about 275 nm to about 400 nm, and fluoresces at a wavelength of from about 575 nm to about 700 nm, with the proviso that when the rare earth metal is europium, dysprosium, or terbium, the chelating ligand is not dibenzoylmethane.

* * * * *